United States Patent [19]

Burns et al.

[11] Patent Number: 5,341,876
[45] Date of Patent: Aug. 30, 1994

[54] BELOW FRACTURE PRESSURE PULSED GEL INJECTION METHOD

[75] Inventors: James L. Burns, The Woodlands; Bryan J. Dicus, Ardmore; Jayanthi K. Jasti, Plano; Jerry J. Kendall, The Woodlands; Jose L. Olmos, The Woodlands; Luis G. Zambrano, The Woodlands, all of Tex.

[73] Assignee: Mobil Oil Corporation, Fairfax, Va.

[21] Appl. No.: 59,149

[22] Filed: May 10, 1993

[51] Int. Cl.$^5$ .................. E21B 33/138; E21B 43/22
[52] U.S. Cl. .................. 166/263; 166/270; 166/292; 166/295
[58] Field of Search .......... 166/263, 270, 292, 294, 166/295, 300

[56] References Cited

U.S. PATENT DOCUMENTS

| | | | |
|---|---|---|---|
| 3,375,872 | 4/1968 | McLaughlin et al. | 166/292 |
| 3,918,521 | 11/1975 | Snavely, Jr. | 166/272 |
| 4,479,894 | 10/1984 | Chen et al. | 252/8.554 |
| 4,489,783 | 12/1984 | Shu | 166/272 |
| 4,513,821 | 4/1985 | Shu | 166/273 |
| 4,565,249 | 1/1986 | Pebdani et al. | 166/303 |
| 4,640,357 | 2/1987 | Jones | 166/292 X |
| 4,735,265 | 4/1988 | Hoskin et al. | 166/270 X |
| 4,838,352 | 6/1989 | Oberste-Padtberg et al. | 166/295 X |
| 4,899,818 | 2/1990 | Jennings, Jr. et al. | 166/270 |
| 4,903,766 | 2/1990 | Shu | 166/270 |
| 4,915,170 | 4/1990 | Hoskin | 166/270 X |
| 5,002,980 | 3/1991 | Phelps et al. | 523/130 |
| 5,215,147 | 6/1993 | Grego et al. | 166/270 |

*Primary Examiner*—George A. Suchfield
*Attorney, Agent, or Firm*—Alexander J. McKillop; George W. Hager, Jr.; Charles A. Malone

[57] ABSTRACT

A method for the injection of a pre-determined volume of gel below a fracture pressure limit is described. The fracture pressure limit for an unfractured formation is the fracture initiation pressure. The pressure limit for a previously fractured formation is the fracture extension pressure. Initially, a desired gel is injected into a thief zone at a constant rate while maintaining the injection pressure below the limiting fracture pressure. When the injection pressure reaches the formation fracture pressure limit, gel injection is halted for a period of about 3 hours. Afterwards, the bottom hole pressure is allowed to decline and stabilize. Next, gel injection is resumed at the same rate and pressure used prior to halting the injection. If necessary gel injection can be halted when the formation's pressure limit is again reached. After a period of about 3 hours, injection of gel can be again commenced. These steps can be repeated until a pre-determined volume of gel has been placed into the thief zone.

5 Claims, 1 Drawing Sheet

BELOW FRACTURE PRESSURE PULSED GEL INJECTION METHOD

FIELD OF THE INVENTION

This invention relates to methods for recovering oil from a subterranean oil-containing formation. More particularly, this invention relates to methods for placement of a gel into a "thief" zone of a formation without fracturing a previously unfractured formation or without extending any fractures already existing in the formation.

BACKGROUND OF THE INVENTION

In the recovery of oil from oil-containing formations, it is usually possible to recover only minor portions of the original oil-in-place by so-called primary recovery methods which utilize only natural forces. To increase the recovery of oil a variety of supplementary recovery techniques are employed. These techniques include water flooding, miscible flooding, thermal recovery, and steam flooding.

A problem that arises in various flooding processes is that different strata or zones in the reservoir often possess different permeabilities. Thus, displacing fluids enter high permeability or "thief" zones in preference to zones of lower permeability. Significant quantities of oil may be left in zones of lower permeability. To circumvent this difficulty the technique of profile control is applied to plug the high permeability zones with polymeric gels and thus divert the displacing fluid into the low permeability, oil rich zones.

Polymeric gels are used to improve the sweep efficiency in reservoirs by reducing the loss of injection fluids into previously swept zones and diverting them to oil-rich zones. Zones previously swept by injection fluids are called thief zones. The aim of polymer gel treatments is to block the thief zones. A polymer and cross-linker mixture is injected into the thief zones and allowed to cross-link and form a gel.

Gel treatments typically involve the injection of a polymer and a cross-linker mixture into the wellbore at a constant injection rate. Injection pressure increases continuously during a gel treatment. The injection pressure increase can be attributed to moving a large bank of viscous liquid and to the increase in viscosity due to gelation. However, the injection pressure must be maintained below either the formation parting pressure or the formation fracture extension pressures.

Formation parting is undesirable since it opens up highly conductive fractures in the thief zones. Since the goal of the gel treatment is to plug the thief zones, it is undesirable to create fractures in the thief zones. These fractures would increase the size of the thief zone and cause a greater amount of gel to be utilized in order to close them off. For this reason, gel injection pressure is maintained below the formation parting pressure. In some instances, the wellbore may already have been fractured prior to gel injection. The fractures may have been created by a hydraulic fracturing process or due to the natural stresses in the reservoir. In this case, gel injection must be accomplished without exceeding the fracture extension pressure. The goal is to avoid further extension of the existing fractures during gel placement. The current practice is to maintain the gel injection pressure below either the fracture initiation or fracture extension pressure depending upon the existence of fractures near the wellbore. This pressure constraint often results in the injection of a smaller volume of gel than was predetermined which results in an area in the thief zone being untreated with gel.

Therefore, what is needed is a method of injecting a gel into a thief zone so as to place a predetermined or designed amount of the gel into a thief zone without fracturing a formation or without extending existing fractures in a formation.

SUMMARY OF THE INVENTION

In the practice of this invention, an amount of gel needed to close off a thief zone in a formation is determined. Thereafter, a desired gel is injected into the formation at a constant rate. Gel injection continues at the constant rate while maintaining the injection pressure below either the fracture initiation pressure or the fracture extension pressure. The pressure is observed and injection continued until the injection pressure reaches the formation parting or fracture extension pressure. When the fracture pressure limit is reached, gel injection is "halted".

During the "halting" period, the bottom hole pressure is allowed to decline and stabilize. Once the bottom hole pressure is stabilized, gel injection is resumed at the same rate as utilized prior to the halting period. If required, injection can be continued until the parting pressure or the fracture extension pressure is again reached. After reaching the fracture pressure limit, gel injection is again halted until the bottom hole pressure declines and stabilizes. The injection and halting steps can be repeated until the predetermined volume of gel has been placed within the thief zone.

It is therefore an object of this invention to place a predetermined volume of gel into a thief zone without either fracturing the formation or extending existing fractures so as to effectively close off a thief zone.

It is another object of this invention to inject larger volumes of gels into a formation than previously possible with a one step constant injection rate.

It is a further object of this invention to place a predetermined volume of gel into the formation while avoiding the formation of additional fractures and thereby minimize the utilization of unnecessary amounts of gel.

DESCRIPTION OF THE PREFERRED EMBODIMENTS

Figure 1:
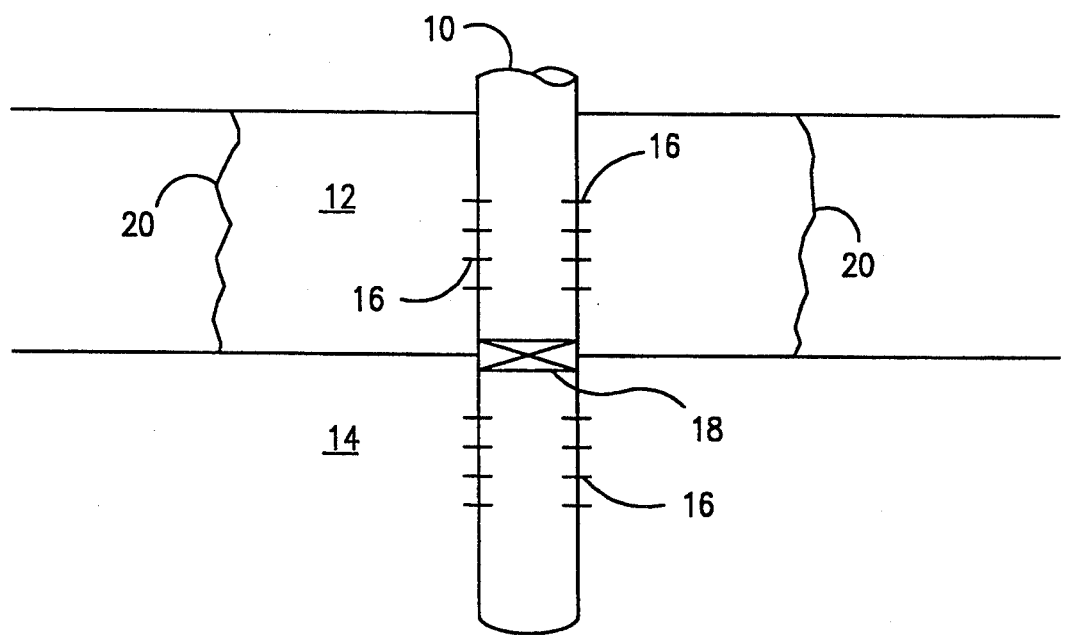
FIG. 1 is a schematic view of a well depicting where a gel has been injected into a thief zone as in the prior art.

As is shown in FIG. 1 prior art methods have been used to inject a gel into thief zone 12 via wellbore 10 and perforations 16 therethrough. Mechanical packer 18 is shown which is used to block lower oil production zone 14 from thief zone 12 thereabove. Because the injection pressure has caused the parting pressure of the formation to be reached, gel injection is ceased and the gel progression or gel front 20 is stopped before all of the predetermined amount of gel is placed into thief zone 12. Because a displacing fluid or gel will enter high permeability or "thief" zones in preference to zones of lower permeability, significant quantities of oil may be left in zones of lower permeability. Mechanical packer 18 has been placed in wellbore 10 to prevent displacing fluids or gels from entering into oil producing zone 14.

Figure 2:
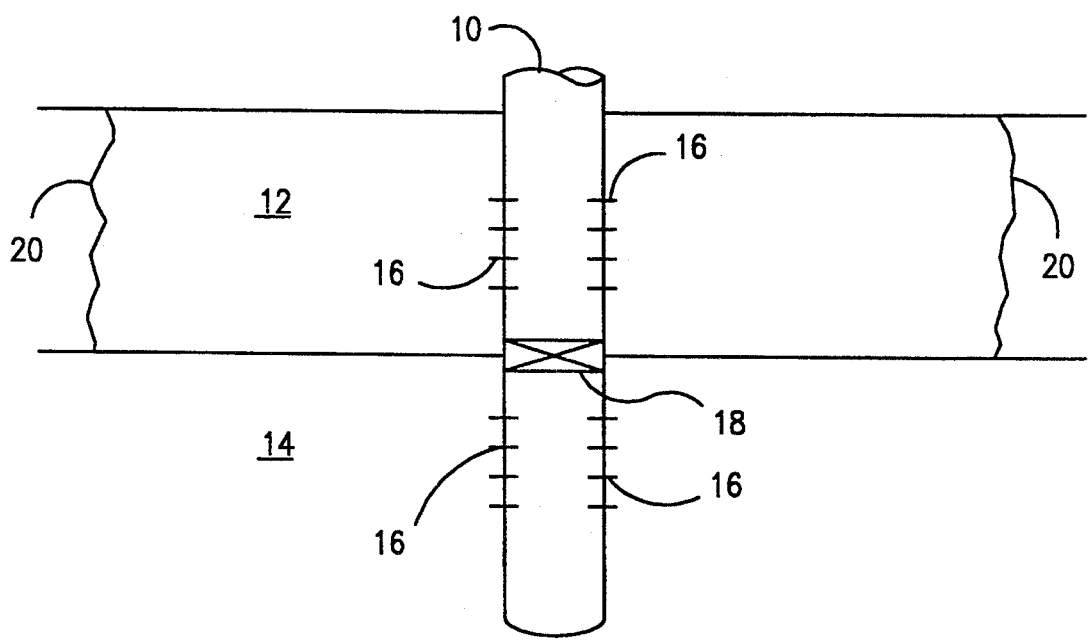
FIG. 2 is a schematic representation which shows the additional progression of a gel which has been injected into a thief zone when using the method of the instant invention.

In the practice of this invention referring to FIG. 2, a gel is injected via wellbore 10 through perforations 16 into thief zone 12. Thief zone 12 is isolated from productive interval 14 by a mechanical packer 18. Gel is injected into wellbore 10 for a time and at a constant injection rate sufficient to cause the parting pressure of the formation to be reached. The injection pressure is maintained below the formation parting pressure. Previously, the amount of gel necessary to close off thief zone 12 has been determined so as to prevent a subsequent enhanced oil recovery injection fluid from entering into productive zone 14. Prior to injecting all of the predetermined volume of gel, the formation parting pressure is reached. When the formation parting pressure is reached, gel injection is halted for a period of from about 1-3 hours. During this halting period, the bottom hole pressure is allowed to decline and stabilize. Once the bottom hole pressure has declined and stabilized gel injection is resumed at the same rate as was used prior to the halting period. Gel injection continues at the rate as before until such time as the formation parting pressure is again reached.

Upon reaching the formation parting pressure, gel injection is again halted or ceased until the bottom hole pressure declines and stabilizes. Once the bottom hole pressure has declined and stabilized, gel injection is again commenced after a period of about 1-3 hours. The steps of injecting the gel at a constant rate until the formation pressure is reached and then halting the injection of the gel for a period of 1-3 hours is continued until such time as the predetermined volume of gel has been injected into the thief zone as desired. When the entire predetermined gel volume has been injected into the thief zone, gel front 20 as depicted in FIG. 2, will have proceeded much further out into the formation than was previously possible with prior art methods as shown in FIG. 1.

A gel which can be used herein is disclosed in U.S. Pat. No. 5,002,980 which issued to Phelps et al. on Mar. 26, 1991. This patent is hereby incorporated by reference herein. As disclosed in this patent, a rehealable xanthan biopolymer is combined with a cross-linked non-selective polyacrylamide polymer gel. The combined gel system is injected into the thief zone where the xanthan biopolymer gel selectively enters the thief zone carrying therewith the non-selective gel. Once in the thief zone, the gel reheals and forms a rigid solid gel with substantially better temperature stability than was previously obtainable with the xanthan gel alone. This gel can be made so as to have a transition time between about 3 to about 19 hours. With this transition time, the gel will be in a pumpable state for the period of time during which gel injection is ceased and the pressure is allowed to stabilize and decrease. The amount of time needed to pump the entire pre-determined volume of gel into the formation can be ascertained by the use of a core sample so as to determine the permeability of the thief zone and the gel size needed to enter said zone. This information then can be used to ascertain how much time will be needed to complete the injection of the predetermined amount of gel. In this manner, the gel time of the first injection can be tailored so as not to form a solid gel until after the last injection period. By use of the gel as disclosed by Phelps et al., the gel time can be extended for a period of up to 19 hours.

Once the predetermined volume of gel has been injected into thief zone 12, the gel is allowed to form a solid. Afterwards, the mechanical packer is removed and an enhanced oil recovery (EOR) method can be commenced in productive interval 14. After closing off the thief zone, a water flooding process as is disclosed in U.S. Pat. No. 4,479,894 which issued to Chen et al. can be utilized. Another EOR process which can be used in the productive interval is described in U.S. Pat. Nos. 4,489,783 and 3,918,521 that issued to Shu and Snavely, respectively. These patents are incorporated by reference herein.

A cyclic carbon dioxide steam simulation EOR method can also be instituted into production interval or zone 14 after closing off thief zone 12. This process is described in U.S. Pat. No. 4,565,249 which issued to Pebdani et al. Increased sweep efficiency can be obtained when the subject gels are used in combination with a carbon dioxide process by lowering the carbon dioxide minimum miscibility pressure ("MMP") and recovering oil. Use of a carbon dioxide MMP process is also described in U.S. Pat. No. 4,513,821 that issued to Shu. These patents are hereby incorporated by reference.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for injecting a predetermined volume of gel into a thief zone comprising:
   (a) injecting a solidifiable gel mixture into a high permeability or thief zone at a constant rate until the formation fracture pressure limit is reached;
   (b) ceasing injection of the gel into the thief zone once the formation fracture pressure limit has been reached but not exceeded for a time sufficient to cause the wellbore or borehole bottom pressure to decline and stabilize; and
   (c) injecting thereafter the gel into said thief zone for a time sufficient to cause the predetermined volume of gel to be placed into said thief zone.

2. The method as recited in claim 1 where steps (a), (b), and (c) are repeated if necessary to obtain a placement of a predetermined volume of gel into a thief zone.

3. The method as recited in claim 1 wherein step (b) gel injection is ceased or halted for a period of 1 to about 3 hours.

4. The method as recited in claim 1 where the gel forms a solid gel in about 3 to about 19 hours.

5. The method as recited in claim 1 where an enhanced oil recovery method is instituted into a lower permeability zone after the thief zone has been closed and a solid gel formed therein.

* * * * *